(12) United States Patent  (10) Patent No.: US 8,367,247 B2
Kim et al.  (45) Date of Patent: Feb. 5, 2013

(54) CATHODE ACTIVE MATERIAL FOR LITHIUM SECONDARY BATTERIES WITH HIGH SAFETY, METHOD OF PREPARING THE SAME AND LITHIUM SECONDARY BATTERIES COMPRISING THE SAME

(75) Inventors: Seong-Bae Kim, Incheon (KR); Woo-Seong Kim, Gyeonggi-do (KR); Yoon-Jeong Heo, Chungcheongnam-do (KR); Sung-Tae Ko, Chungcheongnam-do (KR); Ji-Jun Hong, Seoul (KR)

(73) Assignees: Daejung EM Co., Ltd., Incheon (KR); Kokam Co., Ltd., Siheung Gyeonggi-Do (KR)

( * ) Notice: Subject to any disclaimer, the term of this patent is extended or adjusted under 35 U.S.C. 154(b) by 532 days.

(21) Appl. No.: 12/528,151

(22) PCT Filed: Nov. 11, 2008

(86) PCT No.: PCT/KR2008/006643
§ 371 (c)(1),
(2), (4) Date: Aug. 21, 2009

(87) PCT Pub. No.: WO2010/053222
PCT Pub. Date: May 14, 2010

(65) Prior Publication Data
US 2010/0310940 A1 Dec. 9, 2010

(30) Foreign Application Priority Data
Nov. 10, 2008 (KR) .................. 10-2008-0111004

(51) Int. Cl.
H01M 4/485 (2010.01)
H01M 4/1391 (2010.01)
B05D 5/12 (2006.01)
(52) U.S. Cl. ............... 429/231.1; 429/231.5; 252/182.1; 427/126.3
(58) Field of Classification Search ............... 429/231.1, 429/231.3, 231.5, 232; 427/126.3; 252/182.1
See application file for complete search history.

(56) References Cited

U.S. PATENT DOCUMENTS

| 6,727,021 B1 * | 4/2004 | Shiota et al. .................. 429/232 |
| 7,611,804 B2 * | 11/2009 | Sakata et al. ............... 429/231.8 |
| 7,682,740 B2 * | 3/2010 | Yong et al. .................... 429/217 |
| 7,923,149 B2 * | 4/2011 | Hwang et al. ................ 429/217 |
| 2004/0258836 A1 | 12/2004 | Besenhard et al. |
| 2007/0003829 A1 | 1/2007 | Imachi et al. |

FOREIGN PATENT DOCUMENTS
EP 1 876 664 A1 1/2008
(Continued)

*Primary Examiner* — Stephen J. Kalafut
(74) *Attorney, Agent, or Firm* — Edwards Wildman Palmer LLP

(57) ABSTRACT

A cathode active material for a lithium secondary battery includes a lithium metal oxide secondary particle core formed by agglomerating lithium metal oxide primary particles; and a shell formed by coating the secondary particle core with barium titanate and metal oxide. This cathode active material allows making a lithium secondary battery having improved safety, particularly in thermal stability and overcharging characteristics.

15 Claims, 6 Drawing Sheets

(a)

(b)

(c)

(d)

FOREIGN PATENT DOCUMENTS

| | | | |
|---|---|---|---|
| JP | 2001-143705 A | 5/2001 |
| JP | 2002-060225 A | 2/2002 |
| JP | 2002-143708 A | 5/2002 |
| JP | 2006-019229 A | 1/2006 |
| JP | 2006-179432 | * | 7/2006 |
| JP | 2006-318815 A | 11/2006 |
| JP | 2007-012441 A | 1/2007 |
| JP | 2009-176597 A | 8/2009 |
| KR | 10-2000-0061755 A | 10/2000 |
| KR | 10-0277796 B1 | 10/2000 |
| KR | 10/2002-0024521 A | 3/2002 |
| KR | 10-2007-0081831 | * | 8/2007 |

* cited by examiner (a)

(b)

(c)

(d)

(e)

CATHODE ACTIVE MATERIAL FOR LITHIUM SECONDARY BATTERIES WITH HIGH SAFETY, METHOD OF PREPARING THE SAME AND LITHIUM SECONDARY BATTERIES COMPRISING THE SAME

CROSS-REFERENCES TO RELATED APPLICATIONS

This application is a U.S. national phase application, pursuant to 35 U.S.C. §371, of PCT/KR2008/006643, filed Nov. 11, 2008, designating the United States, which claims priority to Korean Application No. 10-2008-0111004, filed Nov. 10, 2008. The entire contents of the aforementioned patent applications are incorporated herein by this reference.

TECHNICAL FIELD

The present invention relates to a cathode active material for lithium second batteries with high safety, a method for preparing the same, and a lithium secondary battery having the same. More particularly, the present invention relates to a cathode active material capable of improving safety of the cathode active material for a lithium ion secondary battery or a lithium ion polymer battery, particularly thermal stability and overcharging characteristics, and a method for preparing the same.

BACKGROUND ART

Along with the rapid development of electronic, communication and computer industries, there are remarkable improvements in camcorders, cellular phones, notebooks and so on. Thus, the demand for lithium secondary batteries is increased day by day as a power source to drive such portable electronic communication devices. In particular, researches and studies are actively progressing not only in Korea but also in Japan, Europe and USA on lithium secondary batteries as an environment-friendly power source that may be applied to electric vehicles, uninterruptible power supplies, electromotive tools and satellites.

Lithium cobalt oxide ($LiCoO_2$) has been frequently used as a cathode active material of a lithium secondary battery, but in these days, lithium nickel oxide ($Li(Ni—Co—Al)O_2$) and lithium composite metal oxide ($Li(Ni—Co—Mn)O_2$) are also used as other layered cathode active materials. In addition, spinel-type lithium manganese oxide ($LiMn_2O_4$) and olivine-type ferric phosphate lithium compound ($LiFePO_4$) with low price and high stability are increasingly consumed.

However, a lithium secondary battery using a lithium cobalt oxide, a lithium nickel oxide or a lithium metal composite oxide exhibit insufficient safety, particularly in thermal stability and overcharging characteristics, though it has basic battery characteristics. As an improvement, there are introduced various safety means such as shutdown functions, additives of electrolyte and safety device like PTC, but such safety means are designed under the condition that cathode active material is not filled to a high level. Thus, if the cathode active material is filled to a high level so as to meet the demands on high capacity, various kinds of safety means tend to be operated inappropriately, and also the safety may be deteriorated.

Also, a spinel-type lithium manganese-based battery has ever been applied to cellular phones at one time. However, in the recent cellular phone market requiring superior functions for the first time, its advantages such as low price and high safety are not utilized due to its gradually deteriorated energy density.

Also, an olivine-type ferric phosphate lithium compound has very low electron conductivity in spite of advantages such as low price and high safety, so excellent battery characteristics are not expected. Also, an average operating potential of the olivine-type ferric phosphate lithium compound is low, which does not satisfy the demands on high capacity.

Accordingly, various researches have been performed to solve the above problem, but an effective solution is not yet proposed.

For example, Japanese Laid-open Patent Publication No. 2001-143705 discloses a cathode active material in which a lithium cobalt oxide and a lithium manganese oxide are mixed. However, this material is just obtained by simply mixing a lithium manganese oxide with excellent safety, so it does not improve characteristics sufficiently.

Also, Japanese Laid-open Patent Publication No. 2002-143708 proposes a cathode active material in which lithium nickel composite compounds with different compositions are provided in two layers. However, since a cathode active material having two layers of lithium nickel composite compounds with different compositions is applied, it cannot be considered as fundamentally sufficiently improving the safety caused by overcharging.

Japanese Laid-open Patent Publication No. 2007-012441 discloses a cathode having two or more cathode active material layers to improve the overcharging characteristics, where an olivine-type ferric phosphoric lithium oxide or a spinel-type lithium manganese oxide is added to the layer contacting with a cathode current collector. However, though the improvement in overcharging characteristics is expected, such oxide layers are formed with a thickness not greater than its average particle size, namely in a level of several micrometers, and conductive material or auxiliary conductive material is not included, so it cannot be considered as having sufficient high-current discharging characteristics.

Japanese Laid-open Patent Publication No. 2006-318815 discloses a technique for coating a surface of secondary particle with lithium salt or lithium oxide so as to improve durability of a lithium nickel oxide. However, it is difficult to coat the entire surface of individual cathode active material secondary particles, so its improvement is not remarkable. Also, since a dry-coating process and a wet-coating process should be added, the productivity is greatly deteriorated.

Japanese Laid-open Patent Publication No. 2006-19229 proposes to coat a surface of secondary particle with lithium cobalt zirconium oxide for the purpose of improving the safety of lithium nickel oxide with weak safety. However, since a dry-coating process should also be applied to coat the surface of lithium nickel oxide secondary particle with lithium cobalt zirconium oxide, the productivity is deteriorated though its effect is remarkably improved.

Thus, it is urgent to develop a cathode active material having excellent safety while keeping excellent battery characteristics, and a method for preparing such a cathode active material with an excellent productivity.

[Disclosure]
[Technical Problem]

The present invention is designed to solve the problems of the prior art, and therefore it is an object of the present invention to provide a cathode active material capable of greatly improving safety, particularly thermal stability and overcharging characteristics, without deteriorating basic characteristics of the cathode active material itself, and to provide a method for preparing such a cathode active material with excellent productivity and reproduction.

[Technical Solution]

In order to accomplish the above object, the present invention provides a cathode active material for a lithium secondary battery, which includes a lithium metal oxide secondary particle core formed by agglomerating lithium metal oxide primary particles; and a shell formed by coating the secondary particle core with barium titanate and metal oxide.

In relation with the background art, there were attempts to coat a surface of lithium metal oxide into a film shape for the purpose of improving reliability of high temperature characteristics of the lithium metal oxide, but all attempts made in the background art were directed to reforming the surface using electrically inactive material, so the inventors found that the surface reformation may give bad effects such as the reduction of unit capacity of the cathode active material itself or the deterioration of high rate characteristics when the cathode active material is used for making a battery.

However, the inventors also found that the cathode active material for a lithium secondary battery according to the present invention may improve thermal stability while keeping excellent electric characteristics by coating a lithium metal oxide secondary particle with barium titanate and metal oxide. Barium titanate changes its crystal structure at about 125° C. to greatly increase an electric resistance as mentioned above, thereby improving thermal stability of the cathode active material.

Also, the sell made of the cathode active material according to the present invention may further include olivine-type ferric phosphate lithium oxide and/or conductive material, selectively. If overcharging occurs, the olivine-type ferric phosphate lithium oxide may limit discharge of lithium from lithium metal oxide corresponding to the core to improve the safety of the cathode active material against overcharging, and the conductive material may improve discharging characteristics of the cathode active material.

In another aspect of the present invention, there is also provided a method for preparing a cathode active material for a lithium secondary battery, which includes (S1) firing metal hydroxide and lithium salt to make a lithium metal oxide secondary particle core in which lithium metal oxide primary particles are agglomerated; (S2) dry-coating the core with barium titanate and metal oxide to form a shell on an outer surface of the core; and (S3) thermally treating the resultant material.

The method for preparing a cathode active material for a lithium secondary battery according to the present invention adopts the dry-coating process, so it allows coating the surface of cathode active material with barium titanate and metal oxide corresponding to the shell with excellent reproduction in an efficient way while keeping a conductive passive film existing on the surface of the cathode active material corresponding to the core.

In the method for preparing a cathode active material according to the present invention, the thermal treatment of the step (S3) may be conducted at 300 to 600° C. for 4 to 12 hours.

The cathode active material for a lithium secondary battery may be used for making a cathode of a lithium secondary battery, or a lithium secondary battery having such a cathode.

BEST MODE

Figure 1:
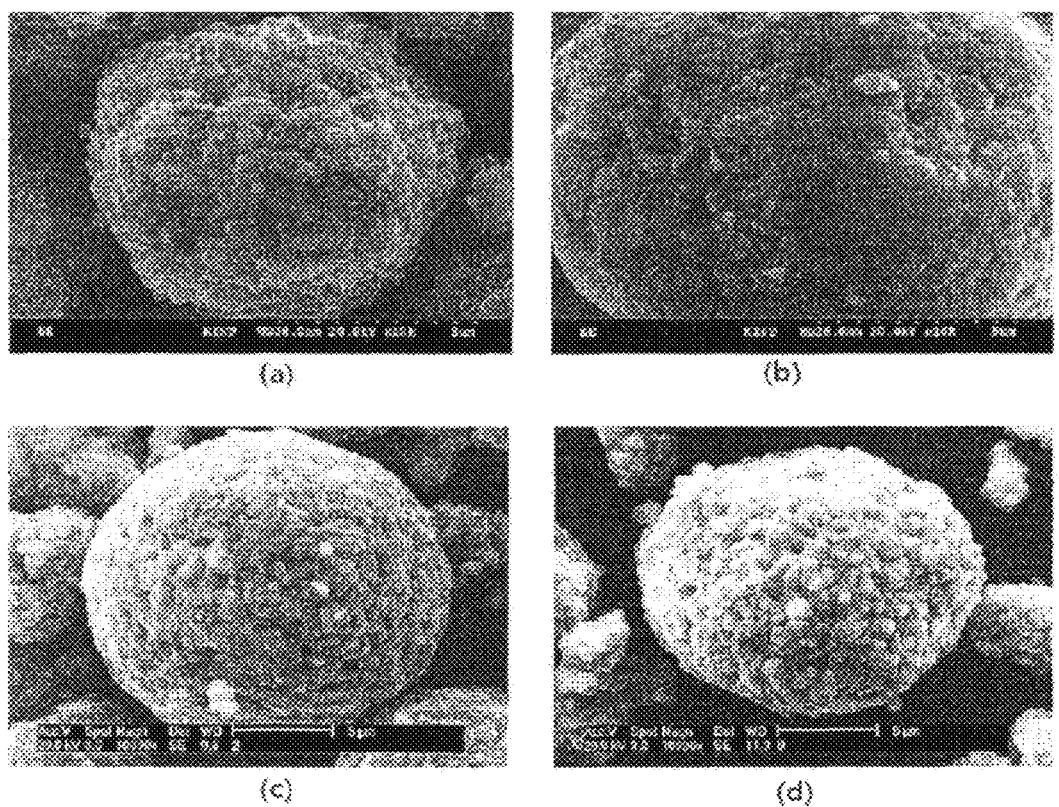
FIG. 1 is a SEM (Scanning Electronic Microscope) photograph showing cathode active materials prepared according to a comparative example 1(a), a example 1(b) of the present invention, a comparative example 2(c) and an example 5(d) of the present invention.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

First, metal hydroxide and lithium salt are fired to make a lithium metal oxide secondary particle core in which lithium metal oxide primary particles are agglomerated (S1).

The lithium metal oxide available in the present invention may employ any lithium metal oxide used as a cathode active material of a lithium secondary battery in the art, with no limitation except olivine-type ferric phosphate lithium oxides. For example, the lithium metal oxide may be at least one selected from the group consisting of $LiCoO_2$, $Li(Ni_a Co_b Al_c)O_2$ ($0<a<1$, $0<b<1$, $0<c<1$, $a+b+c=1$), $Li(Ni_a—Co_b—Mn_c)O_2$ ($0<a<1$, $0<b<1$, $0<c<1$, $a+b+c=1$) and $LiMn_2O_4$, or their mixtures, but not limitedly.

The lithium metal oxide secondary particle used as a core in the present invention is configured such that lithium metal oxide primary particles are agglomerated therein, and it is made by firing metal hydroxide and lithium salt, as explained below in detail.

There are various methods for making metal hydroxide in the art, and the present invention is explained based on the coprecipitation method as an example. The above metal hydroxide employs various raw materials correspondingly according to a targeted cathode active material. As main raw materials, metal salt may use sulphate, nitrate, acetate or the like. A solution containing such metal salt is successively put under the coprecipitation circumstance to successively take slurry containing metal hydroxide in the form of reactant, and then metal hydroxide is made by means of washing, filtration and drying.

If such metal hydroxide is used in making a lithium metal oxide as mentioned above, it is possible to restrict introduction of impurities contained in each metal salt, to control a composition to the atom level, to maximize an adding effect of different kinds of elements introduced with a small amount, and to easily make a lithium metal oxide having a uniform crystal structure with substantially no impurity.

The lithium metal oxide of the present invention may be made by thermally treating the metal hydroxide, prepared from raw material precursors by the hydroxide coprecipitation method, at a certain temperature and mixing it with various kinds of lithium salts into a desired composition, and then firing it under a common firing condition. The lithium metal oxide prepared as mentioned above is obtained as a lithium metal oxide secondary particle in which lithium metal oxide primary particles are agglomerated. An average diameter of the primary particles that configure the secondary particle may be variously changed depending on coprecipitation circumstances according to a composition ratio of the metal hydroxide, and it is not limited to any range.

Also, an average diameter of the secondary particles may be variously changed depending on usage or production circumstances, and it may be 7 to 15 µm for example, but not limitedly. When the average diameter of the secondary particles is in the above range, the stability of secondary particles becomes more excellent in a following dry-coating process of barium titanate and metal oxide, and the efficiency and reproduction of the coating process are further improved.

The shape of the secondary particle is not specially limited, but the efficiency of the coating process for applying olivine-type ferric phosphate lithium oxide to a surface of the secondary particle may be further improved when the secondary particle has a spherical shape.

After that, the core is dry-coated with barium titanate and metal oxide to form a shell on an outer surface of the core (S2).

The term 'barium titanate' used herein includes not only pure barium titanate but also barium titanate to which a small amount (0.1 to 1.5 weight %) of elements such as La, Ce, Nd, Pr, Sm, Gd, Nb, Bi, Sb and Ta are added. Barium titanate is a high dielectric material, and it is a PTC (Positive Temperature Coefficient) thermistor whose resistance is increased as temperature increases. The barium titanate changes its crystal structure at about 125° C. to greatly increase an electric resistance as mentioned above, so it may improve thermal stability of the cathode active material according to the present invention.

An average diameter of the barium titanate employed in the present invention may be changed variously according to usage and production circumstance, and for the purpose of the present invention, the average diameter is preferably not greater than 1 µm. As the average diameter is far smaller than 1 µm, the efficiency of the dry-coating process executed in the present invention may be maximized, so the average diameter has no lower limit. For example, the average diameter may be 1 nm, but not limitedly. If the average diameter exceeds 1 µl, the efficiency and reproduction of the surface-coating process of a metal composite oxide corresponding to the core are deteriorated, undesirably. In other words, in case a dry-coating process is applied, it is required that a material to be coated should have a sufficient specific surface area so as to coat the surface of the cathode active material, namely a specific surface area, into a film shape. Thus, if the average diameter exceeds 1 µl, the ratio of material participating in the coating process is decreased, and the material partially remains as a simple mixture, undesirably.

The content of barium titanate employed in the present invention may be suitably selected according to the kind of battery using the cathode active material. For example, the content of barium titanate may be 0.05 to 1 parts by weight, based on 100 parts by weight of the core, but not limitedly. If the content is less than 0.05 parts by weight, the effect of barium titanate is insufficient. If the content exceeds 1 part by weight, as the content is increased, the high-rate characteristics may be deteriorated due to the deterioration of specific capacity and the reduction of conductivity of the cathode active material.

The metal oxide having a nanometer size, employed in the present invention, plays a role of binder between the barium titanate and the core, and it gives a direct influence on disintegration or spherization of the core. Also, the metal oxide prevents direct contact of electrolyte to the core, thereby further improving stability and cycle characteristics. In addition, various additional improvements in properties may be made according to the kind of metal oxide.

For example, in case aluminum oxide ($Al_2O_3$) is mixed, though a battery capacity is slightly decreased, powder characteristics are improved, the bonding of olivine-type ferric phosphate lithium oxide is reinforced, and additionally improvement of high temperature characteristics or the like is expected. It has been revealed that, as electrically inactive metal oxide coexists in the shell, the surface of lithium metal oxide corresponding to the core is relatively limitedly contacted with electrolyte during high temperature storage or high temperature cycles, thereby improving the characteristics. Also, it is known in the art that metal oxides such as titanium oxide ($TiO_2$), yttrium oxide ($Y_2O_3$), magnesium oxide (MgO) and zinc oxide (ZnO) also exhibit similar characteristics. In addition, lithium metal oxide may be further included, from which improvement in rapid charging/discharging characteristics and cycle characteristics is expected without decreasing a battery capacity. The lithium metal oxide may use a layered lithium metal composite oxide, a lithium cobalt oxide, a spinel-type lithium manganese oxide and so on.

However, the coating material applied to the shell is not limited to the above, but various kinds of nano-size metal oxide materials may be used in combination according to desired improvement in functionality of the shell such as stability, high temperature characteristics and conductivity.

The average diameter of the metal oxide employed in the present invention may be variously changed according to usage and production circumstance, for example 1 to 100 nm, but not limitedly. In the above range of average diameter, it is possible to control the reduction of a battery capacity to the minimum and thus maximize the effect of a formed shell. In detail, as the average diameter is smaller, the specific surface area participating in coating is maximized, so the shell may be formed with only a small amount of metal oxide and thus its effect may be maximized. If the metal oxide has a size less than 1 nm, it is not easy to prepare the material itself, so the cost for producing the core-shell type cathode active material may be increased. If the metal oxide has a size exceeding 100 nm, the specific surface area is decreased, so an amount of metal oxide is increased to coat the shell into a film shape, which may decrease a battery capacity.

The content of metal oxide employed in the present invention may be suitably selected according to the kind of battery using the cathode active material. For example, the content of metal oxide may be 0.05 to 1 parts by weight, based on 100 parts by weight of the core, but not limitedly. If the content is less than 0.05 parts by weight, the effect of metal oxide is insufficient. If the content exceeds 1 part by weight, a specific capacity of cathode active material may be deteriorated.

Selectively, in the cathode active material of the present invention, an olivine-type ferric phosphate lithium oxide having the greatest increase rate of resistance according to overcharging may be included in the shell-forming material, and then it may be applied to the core. The olivine-type ferric phosphate lithium oxide limits the contact between the cathode active material of the core and the electrolyte at overcharging. Accordingly, an amount of lithium discharged from the cathode active material of the core is limited, and thus an amount of lithium precipitated on the anode is reduced, which decreases a caloric value caused by the reaction with electrolyte, thereby improving safety, particularly against overcharging.

An average diameter of the olivine-type ferric phosphate lithium oxide employed in the present invention may be changed variously according to usage and production circumstance, and for the purpose of the present invention, the average diameter is preferably not greater than 1 μm. As the average diameter is far smaller than 1 μm, the efficiency of the dry-coating process executed in the present invention may be maximized, so the average diameter has no lower limit. For example, the average diameter may be 1 nm, but not limitedly. If the average diameter exceeds 1 μm, the efficiency and reproduction of the surface-coating process of a metal composite oxide corresponding to the core are deteriorated, undesirably. In other words, in case a dry-coating process is applied, it is required to ensure a sufficient specific surface area of nano cathode active material to be coated for the purpose of coating the surface of the cathode active material, namely a corresponding specific surface area, into a film shape. Thus, if the average diameter exceeds 1 μm, the ratio of cathode active material participating in the coating process is decreased, and the material partially remains as a simple mixture, undesirably.

The content of olivine-type ferric phosphate lithium oxide employed in the present invention may be suitably selected according to the kind of battery using the cathode active material. For example, the content of olivine-type ferric phosphate lithium oxide may be 0.05 to 5 parts by weight, based on 100 parts by weight of the core, but not limitedly. If the content is less than 0.05 parts by weight, the purpose of applying the olivine-type ferric phosphate lithium oxide, namely the purpose for improving overcharging characteristics, is not sufficiently accomplished. If the content exceeds 5 part by weight, an amount of olivine-type ferric phosphate lithium oxide not participating in the coating process but existing as a simple mixture is increased, which may give bad influences such as deterioration of average discharge voltage, undesirably.

Selectively, in the cathode active material according to the present invention, a conductive material may be included in the shell-forming material and then applied to the core. The conductive material controls the increase of powder resistance caused by the shell-forming material, thereby allowing the cathode active material to keep excellent discharging characteristics.

The conductive material employed in the present invention may include conductive metal, conductive polymer and conductive carbon, Ketjen black, acetylene black, Super-P, graphite, activated carbon and so on as examples of the conductive carbons, however the present invention is not limited thereto. The conductive material preferably has an average particle size of 1 μm all or less. As the average particle size is smaller than 1 μm, a specific surface area of the conductive material increases to reduce its addition amount, so the minimum of the average particle size is not limited to a specific value. For example, a conductive material may have an average particle size of 1 nm, but not limitedly. If the average particle size exceeds 1 μm, it is difficult to form a shell together with other shell-forming materials due to the great size, undesirably.

The content of the conductive material included in the shell according to the present invention may be suitably selected according to the kind of battery using the cathode active material. For example, 0.1 parts or more by weight of the conductive material may be included based on 100 parts by weight of the core, but the present invention is not limited thereto. If the content of the conductive material is less than 0.1 parts by weight, the used conductive material gives insignificant effect. Also, in the case that an excessive amount of conductive material is used, surplus conductive material remains on the surface of the cathode active material of the core, and it eliminates the need of an additional conductive material while preparing slurry, thereby reducing the time required to prepare the slurry. However, in consideration of the purpose of the electrically inactive shell-forming materials directed to improving conductivity, the content of the conductive material in the shell is preferably not greater than 10 parts by weight, more preferably not greater than 5 parts by weight, most preferably not greater than 3 parts by weight, but not limitedly.

In order to coat the cathode coating material core according to the present invention, there may be used a dry-coating method and a wet-coating method, as well known in the art. In most conventional cases, the wet-coating method was applied for the purpose of uniform dispersion of coating material. Namely, in general cases, a dispersion solution or a suspension solution in which a coating material is dispersed or an organic solution or an aqueous solution in which a coating material is dissolved is sprayed or impregnated into a cathode active material, and then dried for coating. However, the wet-coating method has a limit in forming a film-type coating layer. In addition, in case a coating solution using water as a solvent is applied, a conductive passivation film of a lithium salt form, formed on the surface of the cathode active material, is removed, so the conductivity of the cathode active material itself is deteriorated. Also, drying and pulverizing processes are additionally required, which become a drawback in mass production.

On the contrary, the dry-coating method used in the present invention is executed such that a coating material corresponding to the shell is applied to a surface of a cathode active material corresponding to the core in a mechanical way, which may gives a shearing force, a collision force or a compression force according to a used equipment, so this method allows simple blending as well as coating.

Generally, a cathode active material obtained by firing lithium and metal hydroxide as a raw material precursor at a high temperature necessarily requires pulverization and classification since sintering happens by some hydroxide precursors with bad spherical shape or an excessive amount of lithium. However, it was substantially impossible to pulverize the metal hydroxide as a raw material precursor into an average diameter while keeping the spherical shape.

However, in the coating method of the present invention using a mechanical way, the lithium metal oxide corresponding to the shell and/or the carbonaceous material of the core are made into spherical shape and disintegrated at the same time by the nanometer-size metal oxide corresponding to the shell, so the powder characteristics may be improved.

Subsequently, the resultant material is thermally treated (S3).

Individual shell-forming material particles corresponding to the shell may get rid of stress caused by firing and mechanical dry-coating, by means of the thermal treatment process after coating, so it is possible to control specific capacity reduction or powder conductivity reduction, caused by the film of the electrically inactive barium titanate and metal oxide. The thermal treatment conditions can be suitably selected according to production circumstances such as the kind of cathode active material of the core. For example, the thermal treatment may be conducted at 300 to 600° C. for 4 to 12 hours, but not limitedly. At the above thermal treatment temperature, the shell exhibits very excellent density, the crystal structure defect of the core may be sufficiently compensated, and the structure of the core may be stably maintained. The thermal treatment time ensures sufficient effects in the above range. If the thermal temperature time exceeds 12 hours, there is expected no additional effects though the thermal treatment time is increased further.

The cathode active material for a lithium secondary battery prepared according to the present invention may be adhered to at least one surface of a cathode electric collector using a binder resin to form a cathode of a lithium secondary battery. The binder resin and the cathode current collector may adopt any common one used in the art without any limitation.

In addition, the cathode for a lithium secondary battery according to the present invention may be used for making a lithium secondary battery together with an anode, a separator interposed between the cathode and the anode, and an electrolyte. The anode, the separator and the electrolyte may adopt any common one used in the art without any limitation.

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

EXAMPLE 1

<Preparation of Lithium Metal Composite Oxide>

Nickel sulfate ($NiSO_4.6H_2O$), manganese sulfate ($MnSO_4.H_2O$) and cobalt sulfate ($CoSO_4.7H_2O$) were dissolved in a refined ion exchange water such that nickel, cobalt and manganese had a mole ratio of 0.5:0.2:0.3, thereby making a metal solution. Also, a sodium hydroxide and an ammonia solution were prepared.

A coprecipitation reactor was used in pH 11.2 and 400 rpm to supply the metal solution at a rate of 5 L/hr and the ammonia solution at a rate of 0.5 L/hr under an inert nitrogen circumstance by means of a quantitative pump. The sodium hydroxide solution was intermittently put such that the solution in the reactor could keep 11.2 pH constantly.

The reaction was executed over 48 hours to obtain slurry containing metal composite hydroxide of regular size. A centrifugal separator-type filter was used to wash and filter the slurry until a filtered solution had pH 9.0 or below, and then the obtained metal composite hydroxide powder was dried at 120° C. over 24 hours to make metal composite hydroxide.

After that, in order to set a stoichiometric ratio with lithium salt, the metal composite hydroxide was thermally treated over 12 hours at a temperature of 300° C., and then it was mixed with lithium salt such that a stoichiometric ratio with lithium salt becomes 1:1.1. This mixture was fired for 24 hours at 950° C. in a high temperature firing furnace capable of controlling temperature, and for 24 hours at 500° C. After that, pulverization and classification were conducted to make a metal composite oxide with a controlled average diameter, and then it was thermally treated for 4 hours at 500° C.

After that, characteristics of the obtained metal composite oxide were evaluated. The made metal composite oxide had a ratio of Ni:Co:Mn as 0.50:0.20:0.30 and had an average diameter $D_{50}$ of 9.7 μm. The above results are listed in brief in the tables 1 and 2, presented below.

<Preparation of Core-Shell Type Cathode Active Material>

The obtained metal composite oxide was used as a core, and barium titanate having an average diameter $D_{50}$ of 220 nm and titanium oxide having an average diameter $D_{50}$ of 20 nm were used as coating materials to make a core-shell type cathode active material. A dry-coating equipment (NOB-130, produced by Hosogawa Micron Co. Ltd., Japan) was applied to mix 6 g of barium titanate and 0.6 g of titanium oxide respectively to 600 g of metal composite oxide such that weight ratios of barium titanate corresponding to a shell and titanium oxide to 100 parts by weight of the core are respectively 1 part by weight and 0.1 part by weight. After that, the mixture was processed at 2700 rpm for 3 minutes and then thermally treated at 500° C. for 4 hours, thereby making a core-shell type cathode active material.

EXAMPLE 2

A cathode active material was made in the same way as the example 1, except that the content of barium titanate was set to 0.2 parts by weight, based on 100 parts by weight of the core.

EXAMPLE 3

A cathode active material was made in the same way as the example 1, except that 1.5 parts by weight of olivine-type ferric phosphate lithium oxide having an average diameter $D_{50}$ of 150 nm was further added based on 100 parts by weight of the core in addition to the barium titanate and the titanium oxide, which configure the shell.

EXAMPLE 4

A cathode active material was made in the same way as the example 3, except that 0.2 parts by weight of Super P having an average diameter $D_{50}$ of 500 nm was further added based on 100 parts by weight of the core in addition to the barium titanate, the titanium oxide and the olivine-type ferric phosphate lithium oxide, which configure the shell.

EXAMPLE 5

A cathode active material was made in the same way as the example 4, except that the metal composite oxide was made to have a composition in which a ratio of Ni:Co:Mn is 0.40:0.30:0.30.

COMPARATIVE EXAMPLE 1 And 2

The metal composite oxide cores obtained in the examples 1 and 5 were respectively used as cathode active materials of the comparative examples 1 and 2.

COMPARATIVE EXAMPLE 3

Cathode active material, barium titanate, metal oxide, olivine-type ferric phosphate lithium oxide and Super-P used to form the core and the shell of the example 4 were simply mixed at the same ratio to make a cathode active material.

Evaluation of Characteristics

1. Powder Characteristics

Average diameter and tap density of the cathode active materials prepared according to the examples 1 to 5 were measured before coating and after coating. The measurement results are listed in the following table 1. The average diameter was measured using a particle size distribution measurer (Mastersizer 2000E, produced by Malvern). While dispersing the cathode active material using ultrasonic wave, the average diameter $D_{50}$ was obtained by means of laser scattering. The tap density was measured from a volume change before and after 500 strokes were conducted, using 100 ml measuring cylinder.

TABLE 1

| | Before coating [a] | | | After coating | |
|---|---|---|---|---|---|
| | Average diameter ($D_{50}$-μm) | Tap density (g/cc) | Coating material [a] | Average diameter ($D_{50}$-μm) | Tap density (g/cc) |
| Example 1 | 9.70 | 2.53 | B, T | 9.45 | 2.63 |
| Example 2 | 9.70 | 2.53 | B, T | 9.52 | 2.61 |
| Example 3 | 9.70 | 2.53 | P, B, T | 9.50 | 2.59 |
| Example 4 | 9.70 | 2.53 | P, B, T, C | 9.54 | 2.57 |
| Example 5 | 10.21 | 2.55 | P, B, T, C | 10.02 | 2.74 | a. Comparative example 1: cathode active material of the example 1 before coating Comparative example 2: cathode active material of the example 5 before coating b. B: $BaTiO_3$, P: $LiFePO_4$, T: $TiO_2$, C: Super-P As seen from the table 1, in the case of the cathode active materials prepared according to the examples 1 to 5 in which nano-size various metal oxides and olivine-type ferric phosphate lithium oxide were applied, it was found that the average diameter was reduced due to partial spherization effect and disintegration effect and also the tap density was increased, in comparison to the cathode active material without a coating layer according to the comparative examples 1 and 2. Also, in the comparative example 3, it was found that powder characteristics were deteriorated due to simple mixing, though not shown in the table 1.

2. Coating Characteristics

In order to check shape and surface characteristics of the core-shell type cathode active material obtained in the examples and the comparative examples, SEM (8564E, produced by HP) photograph was taken. SEM photographs of the comparative example 1(a) and the example 1(b) and SEM photographs of the comparative example 2(c) and the example 5(d) are respectively shown in FIG. 1. Also, FIG. 2 shows a sectional shape of the core-shell type cathode active material prepared according to the example 5 and a mapping image of each component (a: mapping image, b: Ti mapping, c: Fe mapping, d: P mapping, and e: C mapping).

Figure 2:
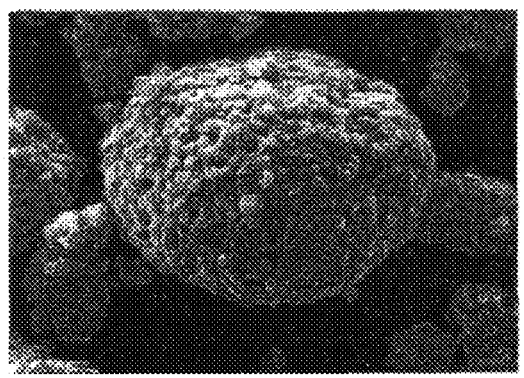
FIG. 2 is a mapping SEM photograph showing a cathode active material particle prepared according to an example 5 of the present invention (a: mapping image, b: Ti mapping, c: Fe mapping, d: P mapping, and e: C mapping)
Figure 2:
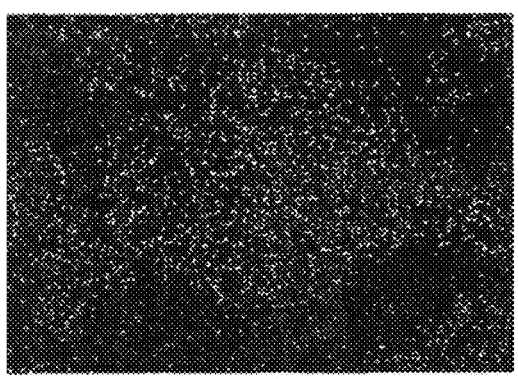
Figure 2:
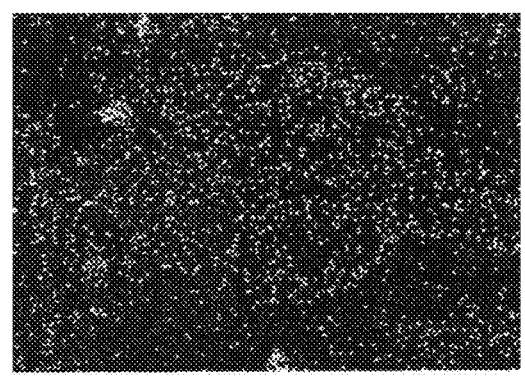
Figure 2:
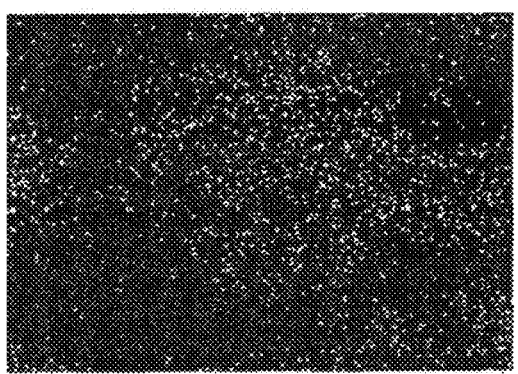
Figure 2:
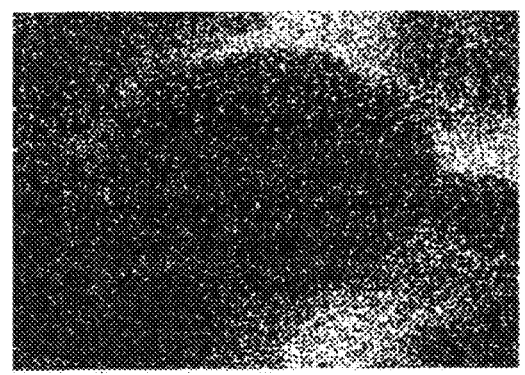

As shown in FIGS. 1 and 2, the cathode active particle of the present invention exhibits excellent surface shape. Also, it was found that the coating material configuring the shell was also uniformly applied.

3. Electrochemical Characteristics i) Evaluation of Half Cell

In order to evaluate initial specific capacity and initial efficiency of the cathode active material obtained in the examples 1 to 5, the cathode active material was mixed with a NMP solution obtained by melting Teflonized acetylene black as conductive material and PVDF as a binding agent to make slurry. In the slurry, a mass ratio of the cathode active material, the conductive material and the binding agent was set to 90:3:7. This slurry was applied onto a 30 μm Al electric collector and then dried, and then it was compressed to a predetermined thickness and blanked into a diameter of 13 mm, thereby making a cathode.

Figure 3:
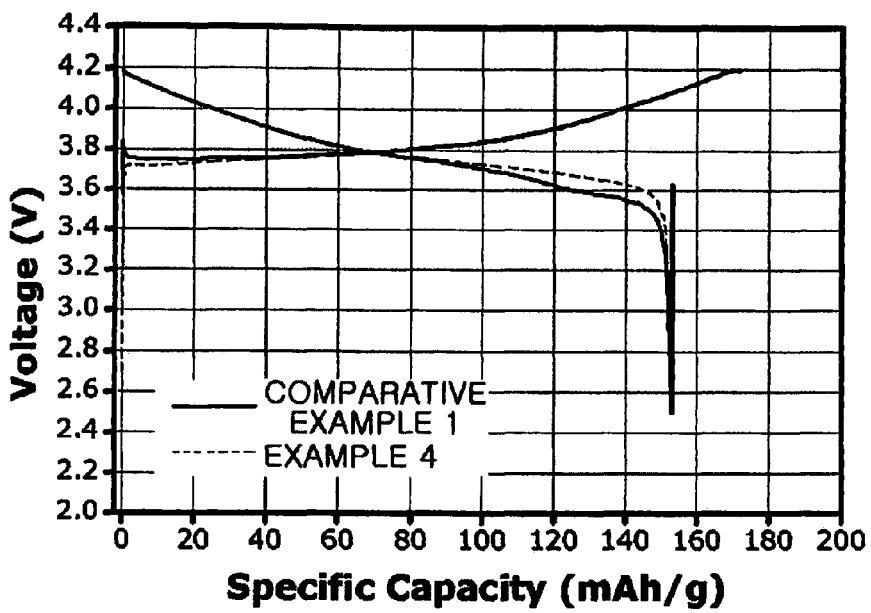
FIG. 3 is a graph showing an initial charging/discharging curve of cathode active materials prepared according to a comparative example 1 and an example 4 of the present invention.
Figure 4:
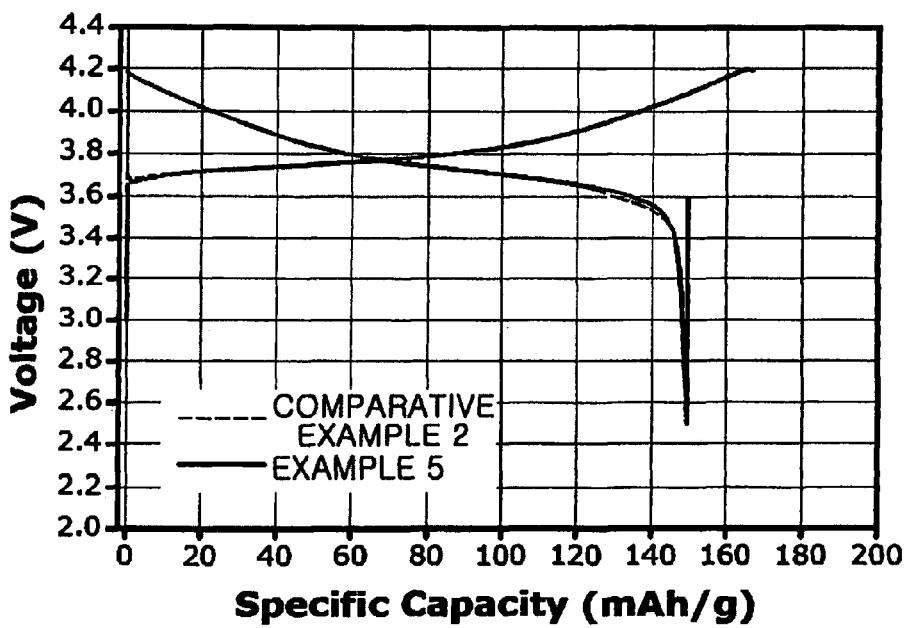
FIG. 4 is a graph showing an initial charging/discharging curve of cathode active materials prepared according to a comparative example 2 and an example 5 of the present invention.

The obtained cathode was used together with a lithium foil as an anode using a separator with a thickness of 20 μm to make a 2032 standard coin-type battery. At this time, the electrolyte adopts 1.2 mol of $LiPF_6$ solution of a mixed solvent of ethylene carbonate and diethyl carbonate (at a volume ratio of 1:3). Charge/discharge capacity of the battery was measured with a current density of 0.2 C at 25° C. in 2.5~4.2V voltage range using a charge/discharge cycle device, in which charge was measured under the constant current-constant voltage condition (0.02 C at a final charge stage) and discharge was measured under a constant current condition. The measurement results are shown in the following table 2. Also, initial charge/discharge curves of the examples 4 and 5 and the comparative examples 1 and 2 are respectively shown in FIGS. 3 and 4.

TABLE 2

| | $1^{st}$ 0.2C charge capacity (mAh/g) | $1^{st}$ 0.2C discharge capacity (mAh/g) | $1^{st}$ efficiency (%) | $1^{st}$ irreversible capacity (mAh/g) | Constant voltage charging ratio (%) |
|---|---|---|---|---|---|
| Example 1 | 171.7 | 151.6 | 88.3 | 20.1 | 1.4 |
| Example 2 | 171.6 | 152.4 | 88.8 | 19.2 | 1.2 |
| Example 3 | 172.0 | 151.5 | 88.1 | 20.5 | 1.2 |
| Example 4 | 172.1 | 153.3 | 89.1 | 18.8 | 0.9 |
| Example 5 | 166.4 | 149.3 | 89.7 | 17.1 | 0.9 |
| Comparative example 1 | 171.5 | 152.8 | 89.1 | 18.7 | 1.1 |
| Comparative example 2 | 166.9 | 149.7 | 89.7 | 17.2 | 0.8 |
| Comparative example 3 | 166.4 | 145.6 | 87.5 | 20.8 | 1.6 |

As seen from the table 2, in the case of the cathode active materials of the examples 1 and 2, which were coated only with electrochemically inactive barium titanate and titanium oxide as a coating material for forming the shell, the specific capacity per unit mass and the initial efficiency of the cathode active materials were decreased according to the coating. Also, in the case of the cathode active material of the example 3, which further includes electrochemically active olivine-type ferric phosphate lithium oxide, the specific capacity per unit mass of the cathode active material was decreased to some extend, but additional effects of each components of the shell were obtained. In other words, the olivine-type ferric phosphate lithium oxide exhibits a stability improving effect against overcharging, the barium titanate exhibits a thermal stability improving effect against the exposure to high temperature, and the titanium oxide exhibits a powder characteristic improving effect during a coating process and a binder effect for the coating materials of the shell. In addition, in case the shell-forming material is simply mixed with lithium metal oxide of the core as in the comparative example 3, the shell-forming material just exists as impurities to the material corresponding to the core, so the initial capacity and the specific capacity were decreased. Meanwhile, in the case of the examples 4 and 5 in which the conductive material Super-P was further included, it was found that the increase of powder resistance of the cathode active material according to the coating of the electrochemically inactive metal oxide is restrained, thereby ensuring more excellent electrochemical characteristics.

ii) Evaluation of Full Cell

In order to evaluate high rate characteristics and safety of the cathode active material obtained in the examples and the comparative examples, the prepared cathode active material was mixed with an NMP solution obtained by dissolving carbon as conductive material and PVDF as a binding agent to make slurry. In the slurry, a mass ratio of the cathode active material, the conductive material and the binding agent was set to 92:4:4. Graphite was used as an anode, and the cathode and the anode were placed to face each other with a separator being interposed between them. Then, an aluminum envelope with a thickness of 113 μm was applied thereto, and then they were sealed in a glove box under an argon circumstance and then thermally bonded to make a pouch-type battery. The battery had a size of 3.7 mm in thickness, 64 mm in width and 95 mm in length, and a design capacity was set to 2000 mAh.

The battery was initially charged/discharged with a current density of 0.2 C (400 mAh) at 25° C. in 3.0~4.2V voltage range using a charge/discharge cycle device, and then charge/discharge experiments were conducted at various current densities. The high rate characteristics was evaluated from a ratio of discharge capacity at 20 C current density using discharge capacity at 0.5 C current density as a criterion capacity. The following table 3 shows high rate characteristics of the cathode active material obtained in the examples and the comparative examples.

Figure 5:
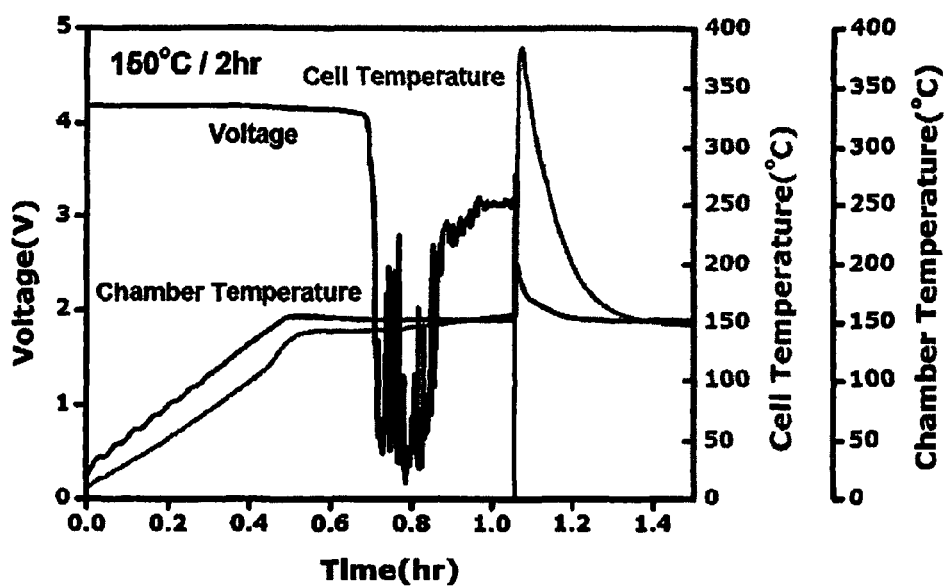
FIG. 5 is a graph showing a thermal stability characteristic according to hotbox storage of a pouch battery to which the cathode active material prepared according to the comparative example 1 is applied.
Figure 6:
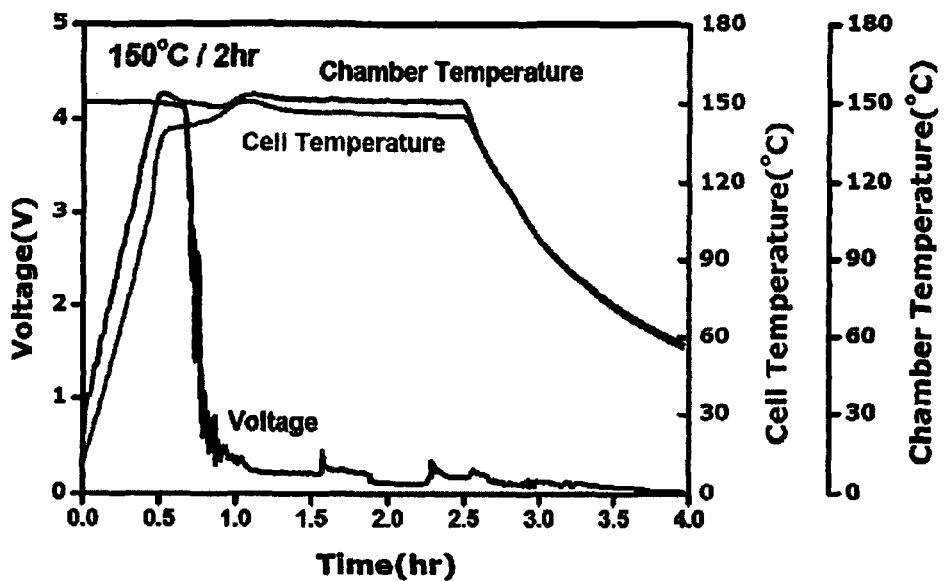
FIG. 6 is a graph showing a thermal stability characteristic according to hotbox storage of a pouch battery to which the cathode active material prepared according to the example 4 of the present invention is applied.

In addition, in order to evaluate thermal stability of the core-shell type cathode active materials obtained according to the examples and the comparative examples, batteries of the same standards adopting the cathode active materials were stored in 150 C hotbox in a 4.2V full-charged state, and then the change of state of the batteries such as firing were examined. The examination results are listed in the following table 3. Also, FIGS. 5 and 6 shows hotbox storage characteristics of the example 1 and the comparative example 1.

Figure 7:
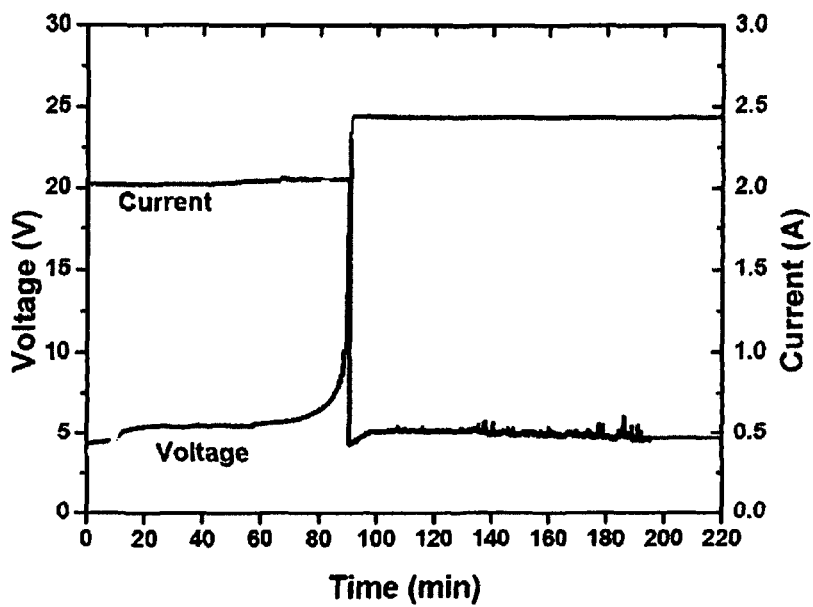
FIG. 7 is a graph showing overcharging characteristics of a pouch battery to which the cathode active material prepared according to the example 4 of the present invention is applied.
Figure 8:
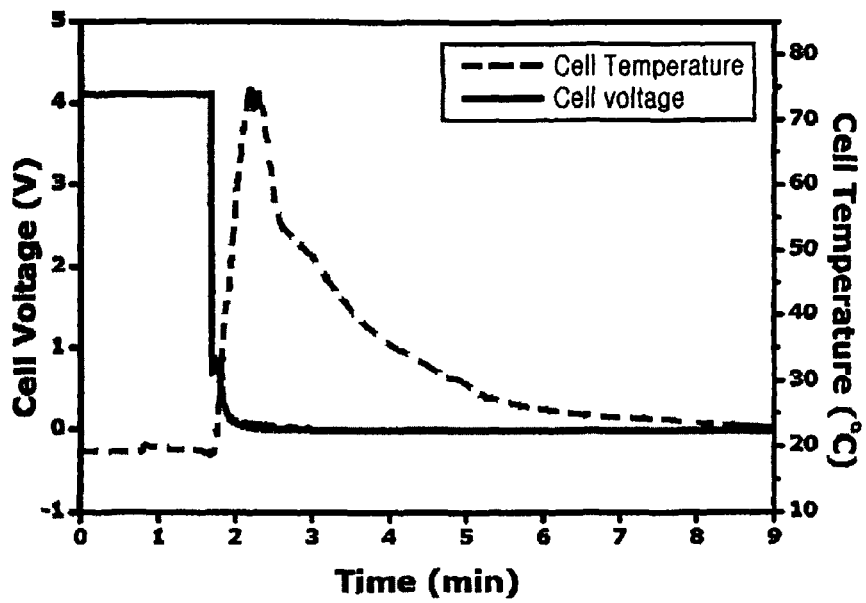
FIG. 8 is a graph showing behavior of a pouch battery to which the cathode active material prepared according to the example 4 of the present invention is applied, according to a nail penetration test.
Figure 9:
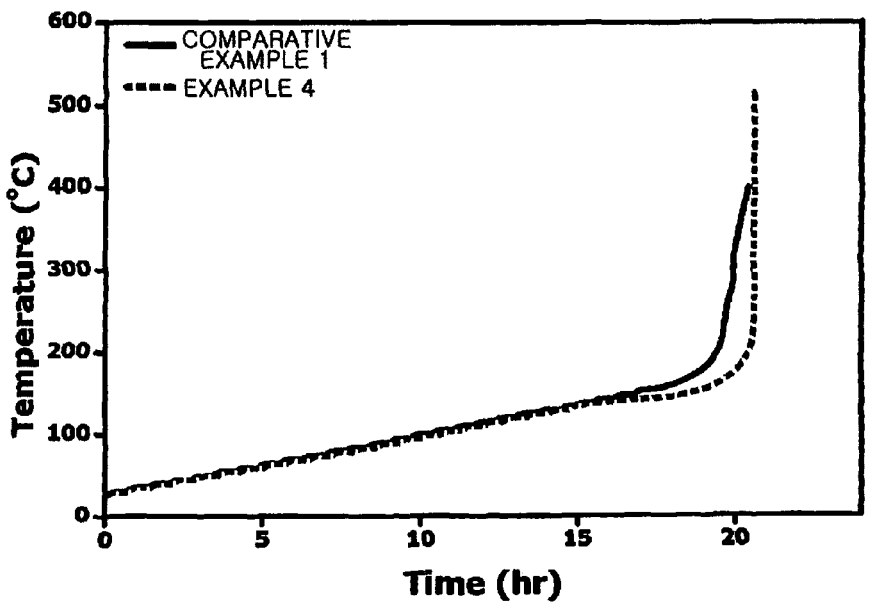
FIG. 9 is a graph showing the results of a self-heating test on a pouch battery using the cathode active material prepared according to the example 4 of the present invention and on a pouch battery using the cathode active material of the comparative example 1.

Also, an additional test was executed to evaluate safety of the core-shell type cathode active material obtained in the examples and the comparative examples. For this test, batteries of the same standards adopting the cathode active materials were used to evaluate overcharging characteristic at 24V with a current density of 1 C (2000 mAh). The evaluation result for the cathode active material of the example 4 is shown in FIG. 7. Also, the result of a nail penetration test is shown in FIG. 8, and the result of a self-heating test is shown in FIG. 9.

TABLE 3

|  | Coating material $^a$ (%) | 20C discharging characteristic (@0, 5C, %) | Hours of keeping high temperature | | |
|---|---|---|---|---|---|
|  |  |  | 1 | 2 | 3 |
| Example 1 | B, T | 75.1 |  |  | ○ |
| Example 2 | B, T | 87.5 |  | ○ |  |
| Example 3 | P, B, T | 78.6 |  |  | ○ |
| Example 4 | P, B, T, C | 88.6 |  |  | ○ |

TABLE 3-continued

|  | Coating material $^a$ (%) | 20C discharging characteristic (@0, 5C, %) | Hours of keeping high temperature | | |
|---|---|---|---|---|---|
|  |  |  | 1 | 2 | 3 |
| Example 5 | P, B, T, C | 86.7 |  |  | ○ |
| Comparative example 1 | X | 88.5 | Firing |  |  |
| Comparative example 2 | X | 86.4 | Firing |  |  |
| Comparative example 3 | Simple mixture | 78.5 | Firing |  |  |

As seen from the table 3, it would be found that the high rate characteristics are partially deteriorated when barium titanate, titanium oxide and olivine-type ferric phosphate lithium oxide were used as materials for configuring a shell. However, in case conductive carbon was further included as the shell-forming material, it was found that the increase of powder resistance of the cathode active material itself, caused by the coating of electrochemically inactive material, was restrained, and thus the discharging characteristics of the cathode active material of the core were kept excellently. However, in the comparative example 3 where the shell-forming material is simply mixed with lithium metal oxide of the core, it was found that electrochemically characteristics (or, high rate characteristics) were greatly deteriorated in comparison to the example 4. Also, it was found that the safety of each shell-forming material, namely thermal stability and overcharging characteristics, was not improved at all. On the contrary, in case of the cathode active material on which the shell was formed by means of coating, it was found that characteristics of each shell-forming material were excellently exhibited.

In addition, as seen from the table 3 and the FIGS. 5 and 6, in case of the cathode active material coated with barium titanate, it was found that thermal stability was greatly improved.

Also, as seen from FIGS. 7 and 8, in case of the example 4 where olivine-type ferric phosphate lithium oxide was used for forming the shell, it could be understood that the safety against overcharging as well as misuse or abuse such as forced short circuit was greatly improved.

In addition, as seen from FIG. 9, in case of the example 4, it was found that self-heating was greatly controlled, so thermal characteristics became excellent, in comparison to the comparative example 1.

Industrial Applicability

The cathode active material for a lithium secondary battery according to the present invention includes a lithium metal oxide core and a shell coated with barium titanate and metal oxide, thereby improving safety of the lithium secondary battery, particularly thermal stability and overcharging characteristics. In addition, the method for preparing a cathode active material for a lithium secondary battery according to the present invention ensures excellent reproduction and productivity in making a core-shell type cathode active material of the present invention.

The invention claimed is:

1. A cathode active material for a lithium secondary battery, comprising:
a lithium metal oxide secondary particle core formed by agglomerating lithium metal oxide primary particles; and
a shell formed by coating the secondary particle core with barium titanate and a metal oxide, wherein the content of the barium titanate is 0.05 to 1 parts by weight, based on 100 parts by weight of the secondary particle core.

2. The cathode active material for a lithium secondary battery according to claim 1,
wherein the lithium metal oxide is selected from the group consisting of $LiCoO_2$, $Li(Ni_aCo_bAl_c)O_2$ ($0<a<1$, $0<b<1$, $0<c<1$, $a+b+c=1$), $Li(Ni_a$—$Co_b$—$Mn_c)O_2$ ($0<a<1$, $0<b<1$, $0<c<1$, $a+b+c=1$) $LiMn_2O_4$, and mixtures thereof.

3. The cathode active material for a lithium secondary battery according to claim 1,
wherein the secondary particle has an average diameter of 7 to 15 μm.

4. The cathode active material for a lithium secondary battery according to claim 1,
wherein the barium titanate has an average diameter of 1 nm to 1μm, and the metal oxide has an average diameter of 1 to 100 nm.

5. The cathode active material for a lithium secondary battery according to claim 1,
wherein the metal oxide is selected from the group consisting of aluminum oxide, titanium oxide, yttrium oxide, magnesium oxide, zinc oxide, lithium metal oxide, and mixtures thereof.

6. The cathode active material for a lithium secondary battery according to claim 5,
wherein the lithium metal oxide is selected from the group consisting of layered lithium metal composite oxide, lithium cobalt oxide, spinel-type lithium manganese oxide, and mixtures thereof.

7. The cathode active material for a lithium secondary battery according to claim 1,
wherein the shell further includes olivine-type ferric phosphate lithium oxide.

8. The cathode active material for a lithium secondary battery according to claim 1,
wherein the shell further includes a conductive material.

9. A method for preparing a cathode active material for a lithium secondary battery, comprising:
(S1) making lithium metal oxide primary particles by firing a metal hydroxide and a lithium salt, and agglomerating the lithium metal oxide primary particles to form a lithium metal oxide secondary particle core;
(S2) dry-coating the core with barium titanate and a metal oxide to form a shell on an outer surface of the core; and
(S3) thermally treating the resultant material.

10. The method for preparing a cathode active material for a lithium secondary battery according to claim 9,
wherein, in the step (S1), the metal hydroxide is made according to a coprecipitation method.

11. The method for preparing a cathode active material for a lithium secondary battery according to claim 9,
wherein, in the step (S2), the core is dry-coated additionally with olivine-type ferric phosphate lithium oxide to form the shell.

12. The method for preparing a cathode active material for a lithium secondary battery according to claim 9,
wherein, in the step (S2), the core is dry-coated additionally with a conductive material to form the shell.

13. The method for preparing a cathode active material for a lithium secondary battery according to claim 9,
wherein, in the step (S3), the thermal treatment is conducted at 300 to 600° C. for 4 to 12 hours.

14. A cathode of a lithium secondary battery, which includes a cathode current collector and a cathode active material layer formed on at least one surface of the cathode current collector and having a cathode active material and a binder resin,
wherein the cathode active material is a cathode active material defined in claim 1.

15. A lithium secondary battery including a cathode, an anode and a separator interposed between the cathode and the anode,
wherein the cathode is a cathode defined in claim 14.

* * * * *